United States Patent Office 3,375,441
Patented Mar. 26, 1968

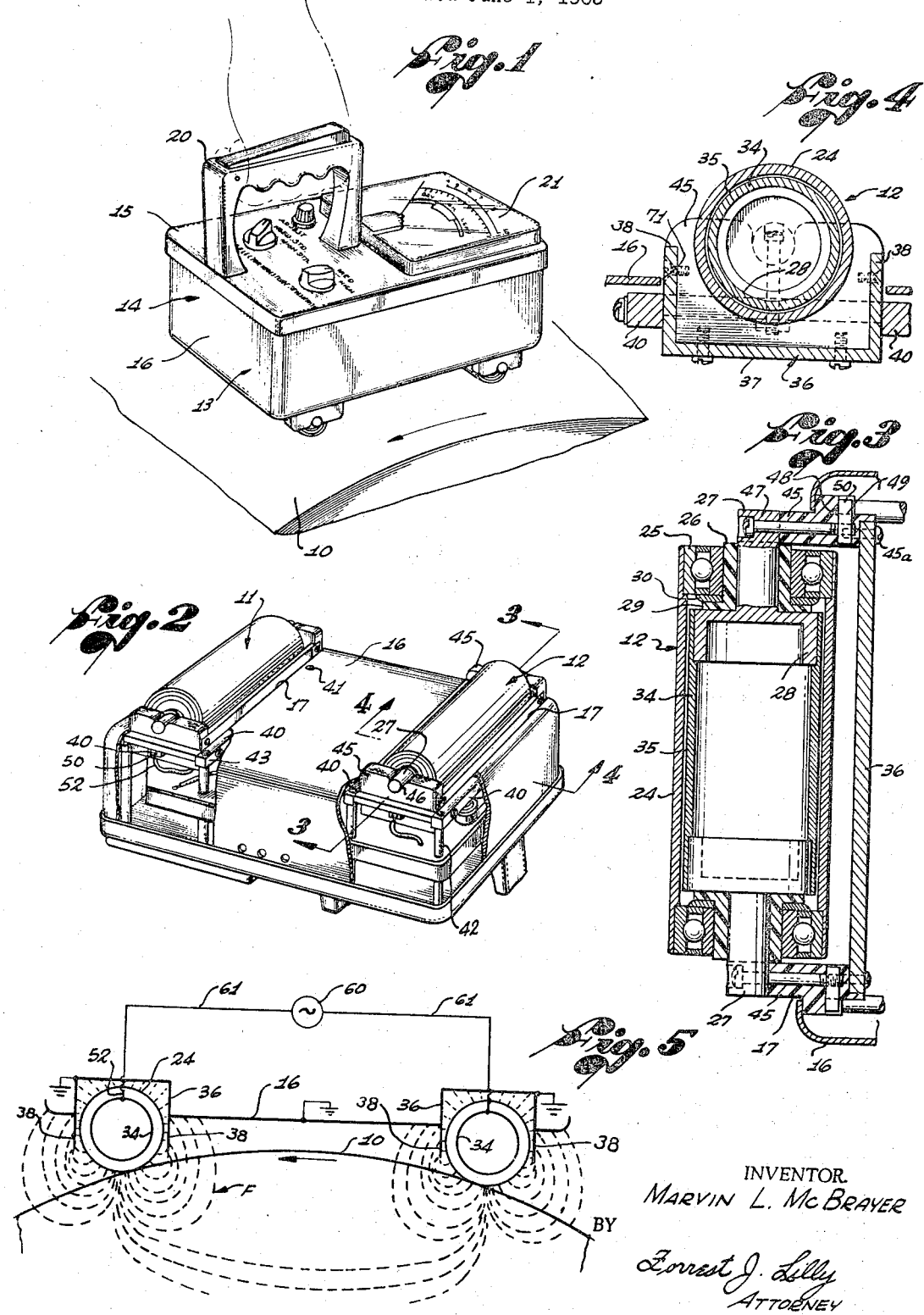

3,375,441
ROLLER ELECTRODE PROBE FOR ELECTRICAL MOISTURE-TESTING INSTRUMENT HAVING A ROTATABLE OUTER CYLINDER CONCENTRIC WITH FIXED INNER CYLINDER ELECTRODE
Marvin L. McBrayer, Alhambra, Calif., assignor to Moisture Register Company, Alhambra, Calif., a corporation of California
Filed June 1, 1965, Ser. No. 460,191
6 Claims. (Cl. 324—61)

ABSTRACT OF THE DISCLOSURE

A system of roller electrodes adapted for application to a rotating roll of paper and the like in an electric moisture determining system. The periphery of the roll of paper is contacted by two parallel, spaced rotatable electrode cylinders, spaced by a narrow annular air gap from a stationary internal electrode cylinder. An electric oscillator circuit is connected at its two sides to the two inside stationarily mounted cylinders. Each pair of outer and inner cylinders forms a coupling condenser, of which the outer cylinder is rotatable. An electric field extends from each outer electrode cylinder through a portion of the roll of paper on test and to a grounded portion of the equipment. The arrangement eliminates the need of a sliding brush type connection from the outer rotatable electrode system to the electrode circuitry, and hence avoids errors and instability owing to variations in resistance occurring at such brushes.

---

This invention relates generally to electrical moisture meters and, more particularly, to a novel and improved roller-type probe for a moisture measurement meter for determining the moisture content in, for example, a roll of paper being wound up from a traveling web.

There is now known an instrument of this type utilizing a probe in the form of two parallel rollers which engage the periphery of a rotating roll of paper and which project a high frequency field into the paper, the rollers being the output electrodes of a high frequency oscillator, usually operating in the megacycle range. See Patent No. 3,046,-479. The two rollers may act as the two elements of an electrical capacitor, being spaced apart from one another to permit a high frequency electric field to extend therebetween. This field penetrates such a substance as a roll of paper to a certain depth when the roller electrodes are held against the surface of the latter, and the effect of any contained moisture in the paper is to influence the electric field formed between the electrodes and, in turn, the electrical state within the oscillator itself such as may be read by a suitable indicating meter. The rollers turn freely with the rotating roll of paper, permitting the electrodes to be held against the rapidly traveling peripheral surface of the roll without vibration or jumping, and thus permitting the taking of readings notwithstanding the motion of the roll. The instrument of the prior art referred to requires that the rotating roll-engaging rollers be electrically connected to the output leads of the oscillator, or that at least one of said rollers be connected to one side of the oscillator, in which case the other electrode roller might be grounded to the case of the instrument. In any event, it is necessary to make electrical connections from the rotating roller to the stationary parts of the equipment, and this requires moving contact surfaces or "brushes." These wiping contacts or brushes are found, in practice, sometimes to introduce variable or unpredictable resistances into the circuit of the oscillator, resulting in erroneous or unstabilized readings. This problem may increase with time owing to accumulation of dirt, or other causes.

It is accordingly the principal object of the present invention to provide an improved roller probe for a moisture testing instrument of the general character described which avoids wiping electrical contacts between the rotating roller electrodes and the stationary parts of the instrument participating in the electric circuit.

Broadly and briefly stated, the invention substitutes for an electrode roller of the older type a pair of concentric cylinders, the outer of which is rotatable and engageable with the rotating roll of paper, while the inside cylinder is stationarily mounted. The two cylinders are spaced by an air gap and are insulated from one another throughout, so as to act as a coupling capacitor. The outside cylinder is insulated from the instrument case, and electrical connection from the oscillator is made through fixed mechanical parts to each stationary inside cylinder. The outside cylinder is thus energized through the air gap between cylinders from the inside cylinder. An electric field pattern then extends from each electrode roller to grounded portions of the adjacent case, also to an optional field concentrating shroud, if used, and/or to the other roller. This field penetrates the roll of paper on test, and permits readings of moisture content to be taken.

It is sometimes highly desirable that the electric field not penetrate too deeply into the roll of paper, so that readings can be taken with only a relatively small amount of paper wound onto the roll, and the instrument here shown for illustrative purposes has a field concentrating shroud, not a part of the present invention, for limitation of the depth of penetration of the electric field by diverting to this shroud.

Reference is now made to the accompanying drawing showing a present illustrative form of the invention, and wherein:

FIG. 1 is a perspective view of a present illustrative embodiment of the invention applied to a rotating roll of paper;

FIG. 2 is a perspective view of the underside of the instrument seen in FIG. 1;

FIG. 3 is a section taken on line 3—3 of FIG. 2;

FIG. 4 is a section taken on line 4—4 of FIG. 2; and

FIG. 5 is a diagrammatic view showing schematically the electric energizing circuit and the operative portions of the invention.

In the drawings, numeral 10 designates fragmentarily a large roll of paper, which is being rolled up from a traveling web, the arrow in FIG. 1 designating the motion of the paper. Applied against the cylindrical periphery of this roll of paper 10, as seen in FIG. 1, are the two roller electrode probes 11 and 12 of a portable, hand-held moisture measurement instrument 13. The latter has an exterior housing generally designated by numeral 14 and comprising a top 15 and a removable case 16 which may be held in place by suitable screws, as later mentioned. The case 16 has two spaced and parallel, rectangular apertures 17 in its bottom through which project the major portion of the roller electrodes 11 and 12, together with a portion of the mounting means therefor, as presently to be described in more detail. The top 15 is provided with a handle 20, an indicating meter 21 and necessary controls as suggested in FIG. 1. The roller electrode probes 11 and 12 are identical, and the description of the probe 12, shown in longitudinal and transverse section in FIGS. 3 and 4, respectively, will suffice for both.

The roller probe 12 comprises an exterior cylinder 24 of electrically conductive material, and this cylinder may be of such electrically conductive materials as stainless steel or aluminum. Preferably, it is composed of aluminum which is anodized on its outer surface for hardening purposes, so as to resist wear. The anodizing coating is of insulation character but does not interfere with the desired electrical performance. This coating is of the order of approximately a thousandth of an inch in thickness, and the surface thus formed on the roller is of substantially zero impedance to the megacycle range oscillating current with which the instrument is energized. The voltage drop across the coating is insignificant. In a typical example, the cylinder 24 is 3.656 inches in length and 1.460 inches in diameter. The rollers 11 and 12 are spaced well apart so as to span a good arc of the cylindric roll of paper, in the proportions approximately as shown. The cylinder 24 is mounted at opposite ends on roller bearings 25, the inner race rings of which are fitted onto insulation bushings 26 which, in turn, surround stub shafts 27 which project entirely through the bushings 26 and the bearings 25. On the inner end of each stub shaft 27 is a radially enlarged, cup-shaped, shaft-end part 28, and the bushing 26 has a radial flange 29 between the cupshaped part 28 and the bearing 25 serving to electrically insulate the bearing 25 from the member 28. A sealing washer 30 is also placed between the insulation flange 29 and the inner race ring of the bearing.

Mounted on the two radially enlarged shaft end parts 28 is an electrically conductive cylindrical shell 34, composed typically of aluminum, or stainless steel, whose outer peripheral surface is spaced by a narrow, annular or cylindrical gap 35, typically of a dimension of .010", from the inside peripheral surface of the exterior cylindrical roller 24. The roller cylinder 24 and the cylindrical shell 34, being thus separated and insulated from one another, form an electrical coupling capacitor, having in this instance a typical capacitance of 230 mmf.

When the instrument is designed for relatively shallow penetration of the electric field into the paper, as is usually desired, each roller assembly as thus described is received partially within an electrically conductive channel member or shroud 36. This channel member, in the design here shown, is generally rectangular in cross-section, having a bottom member 37 and two side flanges 38. The spacing of the side flanges 38 is such as indicated best in FIG. 4 and is designed to cooperate in the establishment of a desirable electric field pattern as to be referred to in more particular hereinafter. It will be seen that the upper edges of the flanges 38 are, in the present design, just below the center axis of the roller probe. Secured to the side flanges 38 are electrically conductive rails 40, composed preferably of aluminum, which underlie and support the removable case 16, and the case 16 may be secured in place by screws threading into these rails, such as indicated at 41. The rails 40 are, in turn, mounted on the upper ends of frame rods 42, composed of electrically conductive material, and understood to be electrically grounded to the frame parts and housing of the instrument. Thus the electrically conductive channel 36 is electrically connected to the rails 40, which are, in turn, fastened, as by screws 43, to the electrically grounded frame rods 42. The channels 36, the rails 40, the frame rods 42, and the case 16 will be seen to be all electrically grounded, the case 16 being, of course, electrically connected to the rails 40 by resting thereon and by means of the screws 41.

At the ends of each channel 36 are insulation end walls 45, fastened to the channels by screws 45a (FIG. 3), and each of these end walls is centrally notched at 46 to receive the extremities of the aforementioned stub shafts 27. The extremities of stub shafts 27, within the region of the notches 46 in end walls 45, are drilled to receive long screws 47 which reach through the end walls 45 to slots 48 accommodating nuts 49 into which the screws are threaded and set tight. The nuts 49 have projecting lugs 50, and electrical connection is made to the inner cylinder 34 by soldering to one lug 50 for each of the rollers 11 and 12 an electrical lead 52 (FIG. 2). It will be understood that the screws 47 and nuts 49 with their electrical connector lugs 50 are insulated from the grounded frame and housing structure of the instrument.

The circuit is continued to the cylinder 34 via the screw 47, the shaft member 27, and the part 28.

Reference is next directed to FIG. 5, showing the instrument diagrammatically, and showing also, in simple diagram, the oscillator circuit by which the system is energized. A high frequency oscillator 60 (usually in the megacycle range) is contained in the instrument, and has its two output leads connected via circuit leads 61 and the aforementioned electrical connections 52 to the inside electrode cylinders 34. The two electrode cylinders 34 are thus always at opposite potentials relative to ground; and from what has been said above, it will be understood that the channels 36 and the instrument case 16 are at ground potential, as designated in FIG. 5. The electrically conductive rollers 24 separated by the small gap 35 from the energized cylinders 34, being capacitively coupled to the cylinders 34, are thus energized to opposite potentials relative to ground, and the return path from the two energized electrode rollers 24 is thus by way of electric paths to grounded portions of the instrument. The electric field, here designated by the letter F, extends from the rollers 24 largely to the grounded shrouds or channels 36, with a substantial portion of it looping first through the roll of paper 10, as suggested by the electric field line pattern in FIG. 5. As will be seen by the diagram, a few field lines extend from one roller 24 to the other through the paper, and these may penetrate somewhat deeply into the paper. These particular field lines may not be particularly desired, especially where relatively shallow penetration is sought, but they cannot be completely avoided and are not bothersome to any material extent. The field lines of primary usefulness are those that extend from the roller 24 into the paper and then loop back to the channel 36 or to the immediately adjacent portions of casing 16, as roughly represented in FIG. 5. It will be seen that the grounded channel members in close proximity to the rollers provide field paths of relatively high voltage gradient to ground, and thus concentrate the field in the paths from the rollers to the channels, with the effect of weakening it at substantial depths into the paper. In the event that deeper penetration should be desired for any reason, the omission of the channel sides 38 will clearly reduce the voltage gradient to the regions of the members 38, and the electric field will be permitted to penetrate much more deeply into the paper before returning to the grounded case, or to the other roller.

The oscillator 60 may be of either of two types, first, one whose interior state is substantially influenced by the varying dielectric constant of a media within an electric field in its output circuit, and, second, one whose interior state is substantially influenced by power absorption from the oscillator by media within an electric field in its output circuit. An example of the first type of instrument is given in Patent No. 3,046,479 issued July 24, 1962, to Mead and McBrayer for Moisture Content Meter. A power absorption type of oscillator is disclosed in a representative form in Patent No. 2,231,035 issued February 11, 1941, to Stephens and Dallas for Power Absorption Metering System. In each case, the electrical indicating instrument 21 is in or across a measurement circuit within the oscillator and provides a reading which varies materially with the moisture present in the paper. Thus, in the first case, the percentage of moisture in the portion of the paper roll 10 penetrated by the electric field has an effect on the dielectric constant of that portion of the paper, and this moisture content percentage can be read directly from the calibrated instrument 21. Similarly, in the second case, the percentage of moisture in the portion of the paper penetrated by the output field of the oscillator determines the power absorption from the oscillator circuit, and this power output can be read at the meter 21, calibrated in terms of percentage of moisture content.

It will be seen that the electrical energizing circuit utilized in the present invention involves a floating oscillator connected through two electric field output regions to ground, each region penetrating the paper, so as to sample the moisture content therewithin. It will be seen that while two rollers are preferably used, each energized as described above, it is also possible to utilize a single energized roller. Such change would involve merely the disconnection of one side of the oscillator 60 from the corresponding roller, and the connection of this side of the oscillator directly to ground. The instrument can be operated in this fashion, using the de-energized roller simply as an idler or stabilizer against the rotating roll of paper. Or, in some simple applications, it may be feasible, where paper roll speed is not too great, or where the roll of paper is not actually in rotation, to omit the disconnected roller entirely.

The invention has been described in one present illustrative form, but it will be understood that various changes in design, structure and arrangement may be made without departing from the spirit and scope of the appended claims.

I claim:

1. An electrical capacitor roller probe for an electrical moisture meter for testing moisture content in a rotating roll of paper or the like, comprising:
    a support having an electrical ground thereon;
    a cylindrical electrode roller assembly on said support with one side thereof unobstructed for application to the periphery of a roll of paper or the like whose moisture content is to be tested;
    said electrode roller assembly comprising:
    an electrically conductive inner cylinder structure having a cylindrical exterior periphery, said cylinder being mounted on but electrically insulated from said support;
    an electrically conductive hollow outer cylinder structure outside of and concentric with said first-named cylinder structure and electrically insulated therefrom, said outer cylinder structure having cylindrical exterior and interior peripheries and with the exterior periphery of the inner cylinder structure spaced from the inside periphery of the outer cylinder structure by a narrow cylindrical air gap for an electric field, whereby said cylinder structures act as an electrical coupling capacitor; and
    mounting means on said support for said outer and inner cylinder structures, including bearing means journaling said outer cylinder structure for free rotation on its longitudinal axis relative to said support; and
    a moisture measurement oscillator circuit connected at one side to said inner cylinder structure and at the other to said electrical ground.

2. The subject matter of claim 1 wherein said outer cylinder structure is composed of aluminum and is anodized on its exterior surface.

3. The subject matter of claim 1, including an electrically conductive shroud means spaced to the side of said outer cylinder structure, and electrically connected to said ground, the spacing between said outer cylinder structure and said shroud means being large relative to the spacing between said outer and inner cylinder structures, whereby the preponderance of the oscillator voltage drop applied between said inner cylindrical structure and ground appears between the outer cylinder structure and said shroud means.

4. An electrical capacitor roller probe for an electrical moisture meter for testing moisture content in a rotating roll of paper or the like, comprising:
    a support having an electrical ground thereon;
    a cylindrical electrode roller assembly on said support with one side thereof unobstructed for application to the periphery of a roll of paper or the like whose moisture content is to be tested;
    said electrode roller assembly comprising:
    an electrically conductive inner cylinder structure having a cylindrical exterior periphery and having end portions with reduced axial stub shafts projecting therefrom;
    an electrically conductive hollow outer cylinder structure outside of and concentric with said first-named cylinder structure having cylindrical exterior and interior peripheries and with the exterior periphery of the inner cylinder structure spaced from the inside periphery of the outer cylinder structure by a narrow cylindrical air gap for an electric field, whereby said cylinder structures act as an electrical coupling capacitor;
    insulation bushings on said stub shaft;
    roller bearings on said insulation bushings supporting the ends of said outer cylinder structure for free rotation;
    said insulation bushings insulating said bearings from said inner cylinder structure;
    mounting means on said support for said stub shafts, including means connecting said stub shafts to said electrical ground; and
    a moisture measurement oscillator circuit connected at one side to said interior cylinder structure and at the other to said electrical ground.

5. An electrical capacitor roller probe for an electrical moisture meter for testing moisture content in a rotating roll of paper or the like, comprising:
    an electrically conductive support;
    a pair of parallel, spaced cylindrical electrode roller assemblies on said support with corresponding sides thereof unobstructed by said support for spanning application to the periphery of a roll of paper or the like whose moisture content is to be tested;
    each of said electrode roller assemblies comprising:
    an electrically conductive inner cylinder structure having a cylindrical exterior periphery;
    an electrically conductive hollow outer cylinder structure outside of and concentric with said first-named cylinder structure and electrically insulated therefrom, said outer cylinder structure having cylindrical exterior and interior peripheries and with the exterior periphery of the inner cylinder structure spaced from the inside periphery of the outer cylinder structure by a narrow cylindrical air gap for an electric field, whereby said cylinder structures comprise an electrical coupling capacitor; and
    mounting means on said support for said outer and inner cylinder structures, including a bearing means journaling each of said outer cylinder structures for free rotation on its axis relative to said support, and means insulating said inner and outer cylinder structures from said support.

6. The subject matter of claim 5 including a moisture measurement oscillator circuit having two output conductors completing conductive paths to said two inner cylinder structures.

References Cited

UNITED STATES PATENTS 2,428,700 10/1947 Eilenberger _____ 324—61
3,246,216 4/1966 Mead et al. _____ 317—246

FOREIGN PATENTS 746,868 3/1956 Great Britain.

RUDOLPH V. ROLINEC, *Primary Examiner.*
E. E. KUBASIEWICZ, *Assistant Examiner.*